United States Patent
Jin et al.

(10) Patent No.: US 12,317,094 B2
(45) Date of Patent: May 27, 2025

(54) COMMUNICATION METHOD AND APPARATUS

(71) Applicant: HUAWEI TECHNOLOGIES CO., LTD., Guangdong (CN)

(72) Inventors: Yinghao Jin, Shanghai (CN); Hongzhuo Zhang, Shanghai (CN); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 507 days.

(21) Appl. No.: 17/371,960

(22) Filed: Jul. 9, 2021

(65) Prior Publication Data

US 2021/0337394 A1 Oct. 28, 2021

Related U.S. Application Data

(63) Continuation of application No. PCT/CN2020/070916, filed on Jan. 8, 2020.

(30) Foreign Application Priority Data

Jan. 9, 2019 (CN) .......................... 201910019950.1

(51) Int. Cl.
*H04W 16/18* (2009.01)
(52) U.S. Cl.
CPC .................................... *H04W 16/18* (2013.01)
(58) Field of Classification Search
None
See application file for complete search history.

(56) References Cited

U.S. PATENT DOCUMENTS

| | | | | |
|---|---|---|---|---|
| 2010/0291929 | A1* | 11/2010 | Stephens ............... | H04W 24/02 455/436 |
| 2011/0201345 | A1* | 8/2011 | Han ...................... | H04W 24/02 455/450 |
| 2013/0150056 | A1* | 6/2013 | Yi ....................... | H04W 36/0061 455/444 |
| 2016/0234733 | A1* | 8/2016 | Sasanapuri ....... | H04W 36/0061 |
| 2016/0242141 | A1* | 8/2016 | Lin ........................ | G01S 5/0236 |
| 2017/0201912 | A1* | 7/2017 | Zingler ................. | H04W 36/08 |
| 2019/0380128 | A1* | 12/2019 | Park ....................... | H04W 48/20 |

(Continued)

FOREIGN PATENT DOCUMENTS

| | | |
|---|---|---|
| CN | 106538037 A | 3/2017 |
| CN | 108668381 A | 10/2018 |
| CN | 108924894 A | 11/2018 |
| CN | 109075932 A | 12/2018 |

(Continued)

OTHER PUBLICATIONS

Ericsson, "(TP for NSA BL CR) Corrections on cell related information," 3GPP TSG-RAN WG3#99 meeting, R3-181371, Athens, Greece, Feb. 26-Mar. 2, 2018, 10 pages.

(Continued)

*Primary Examiner* — Kodzovi Acolatse
(74) *Attorney, Agent, or Firm* — Fish & Richardson P.C.

(57) ABSTRACT

A communication method and an apparatus providing a PCI allocation and optimization solution are provided. The method includes that a distributed unit receives first information sent by a central unit, where the first information includes at least one of the following: allowed PCI information, unallowed PCI information, or PCI conflict information; and the distributed unit determines a PCI of a serving cell of the distributed unit based on the first information.

20 Claims, 9 Drawing Sheets

(56) References Cited

U.S. PATENT DOCUMENTS

| | | | | |
|---|---|---|---|---|
| 2020/0120724 | A1* | 4/2020 | Vaidya | H04W 76/27 |
| 2021/0045170 | A1* | 2/2021 | Luo | H04W 36/06 |
| 2021/0058854 | A1* | 2/2021 | Luo | H04W 24/02 |
| 2021/0084698 | A1* | 3/2021 | Prakash | H04W 76/27 |
| 2022/0022264 | A1* | 1/2022 | Centonza | H04W 74/0866 |

FOREIGN PATENT DOCUMENTS

| | | | | |
|---|---|---|---|---|
| CN | 109151924 A | | 1/2019 | |
| CN | 104956709 B | * | 4/2019 | H04W 16/18 |
| CN | 112839339 A | * | 5/2021 | |
| KR | 20160092391 A | * | 8/2016 | |
| WO | WO-2010051706 A1 | * | 5/2010 | H04W 24/02 |
| WO | 2016019977 A1 | | 2/2016 | |
| WO | WO-2016045337 A1 | * | 3/2016 | H04W 16/02 |
| WO | 2016154604 A1 | | 9/2016 | |
| WO | WO-2021034254 A1 | * | 2/2021 | H04W 24/02 |

OTHER PUBLICATIONS

Ericsson, "Cells information from gNB-DU to gNB-CU," 3GPP TSG RAN WG3 Meeting #98, Tdoc R3-174783, Reno, Nevada, USA, Nov. 27-Dec. 1, 2017, 5 pages.

Office Action issued in Chinese Application No. 201910019950.1 on Mar. 3, 2022, 4 pages.

Ericsson, "(TP for NSA BL CR) Corrections on cell related information," 3GPP TSG RAN WG3 NR #99, R3-181317, Athens, Greece, Feb. 26-Mar. 2, 2018, 10 pages.

Extended European Search Report issued in European Application No. 20738945.3 on Dec. 23, 2021, 6 pages.

Nokia et al., "Introduction of E1 overall architecture," 3GPP TSG-RAN WG3 Meeting #99, R3-181039, Athens, Greece, Feb. 26-Mar. 2, 2018, 7 pages.

Qualcomm Incorporated et al., "Automatic PCI Selection at Relay Nodes," 3GPP TSG-RAN WG3 #70, R3-103406, Jacksonville, USA, Nov. 15-19, 2010, 2 pages.

Huawei, "PCI Selection for NR cells," 3GPP TSG-RAN3 Meeting #103, R3-190378, Athens, Greece, Feb. 25-Mar. 1, 2019, 3 pages.

Huawei, "Support for SON functions in NG-RAN," 3GPP TSG-RAN3 Meeting #101bis, R3-186027, Chengdu, China, Oct. 8-12, 2018, 4 pages.

Office Action in Chinese Application No. 201910019950.1, dated Mar. 26, 2021, 12 pages.

PCT International Search Report and Written Opinion in International Application No. PCT/CN2020/070916, dated Apr. 8, 2020, 18 pages.

* cited by examiner

The cell A and the cell B have
a same frequency and PCI

The cell B and the cell C have a same frequency and PCI
The Cell B and the cell C are configured neighbor cells of the cell A The cell C is a configured       The cell B is not a configured
neighbor cell of the cell A      neighbor cell of the cell A The cell B and the cell C have
a same frequency and PCI

COMMUNICATION METHOD AND APPARATUS

CROSS-REFERENCE TO RELATED APPLICATIONS

This application is a continuation of International Application No. PCT/CN2020/070916, filed on Jan. 8, 2020, which claims priority to Chinese Patent Application No. 201910019950.1, filed on Jan. 9, 2019. The disclosures of the aforementioned applications are hereby incorporated by reference in their entireties.

TECHNICAL FIELD

This application relates to the communications field, and in particular, to a communication method and an apparatus.

BACKGROUND

In a new communication standard, a new CU-DU architecture is defined for an access network device. In this architecture, the access network device is divided into two parts, namely, a central unit (CU) and a distributed unit (DU), based on protocol stack functions. Both the CU and the DU are logical nodes. One CU may be connected to one or more DUs, to implement a function of the access network device.

However, in the CU-DU architecture, the DU cannot obtain PCI information used by a neighbor access network device or another DU connected to a same CU. In addition, different CU-DU architectures may be from different vendors, and operation, administration, and maintenance (OAM) devices corresponding to the CU-DU architectures are different. Consequently, physical cell identifier (PCI) allocation is more complex.

SUMMARY

This application provides a communication method and an apparatus, to improve PCI allocation efficiency.

According to a first aspect, a communication method is provided. The method includes: A distributed unit receives first information sent by a central unit, where the first information includes at least one of the following: allowed PCI information, unallowed PCI information, or PCI conflict information; and the distributed unit determines a PCI of a serving cell of the distributed unit based on the first information.

In this embodiment of this application, the distributed unit receives the first information sent by the central unit, and the first information is used to indicate the allowed PCI information, the unallowed PCI information, or the PCI conflict information, so that the distributed unit determines the PCI of the serving cell of the distributed unit based on the first information. In this way, a PCI collision or confusion can be avoided, to improve PCI allocation efficiency.

With reference to the first aspect, in a possible implementation, that the distributed unit determines a PCI of a serving cell of the distributed unit based on the first information includes: The distributed unit determines the PCI of the serving cell of the distributed unit based on configured PCI information and the first information.

In this embodiment of this application, based on the configured PCI information, the distributed unit may preclude an unallowed PCI or a conflicting PCI indicated in the first information, and then determine the PCI of the serving cell of the distributed unit, so that a PCI allocation and optimization solution can be provided, to improve PCI allocation efficiency.

With reference to the first aspect, in a possible implementation, the method further includes: The distributed unit receives the configured PCI information from a network management device.

With reference to the first aspect, in a possible implementation, the method further includes: The distributed unit sends a first update request message to a network management device, where the first update request message is used to request to update the configured PCI information; and the distributed unit receives updated configured PCI information from the network management device.

In this embodiment of this application, the distributed unit sends the first update request message to the network management device, and receives the updated configured PCI information, so that the distributed unit allocates the PCI to the serving cell of the distributed unit. In this way, a PCI allocation and optimization solution can be provided, to improve the PCI allocation efficiency.

With reference to the first aspect, in a possible implementation, that the distributed unit determines a PCI of a serving cell of the distributed unit based on the first information includes: The distributed unit sends second information to a network management device, where the second information includes all or a part of the first information; and the distributed unit receives PCI allocation information sent by the network management device, where the PCI allocation information is used to indicate the PCI allocated to the serving cell of the distributed unit.

In this embodiment of this application, the distributed unit sends the second information to the network management device, and the second information includes all or the part of the first information, so that the network management device determines, based on the second information, a PCI of each serving cell of the distributed unit. In this way, a PCI allocation and optimization solution can be provided, to improve the PCI allocation efficiency.

With reference to the first aspect, in a possible implementation, the method further includes: The distributed unit sends third information to the central unit, where the third information includes the initial configured PCI information or the updated configured PCI information.

In this embodiment of this application, the distributed unit sends the third information to the central unit, and the third information is used to indicate the initial configured PCI information or the updated configured PCI information configured for the distributed unit, so that the central unit determines, based on the third information, the first information to be sent to the distributed unit. In this way, a PCI allocation and optimization solution can be provided, to improve the PCI allocation efficiency.

With reference to the first aspect, in a possible implementation, the method further includes: The distributed unit sends an interface establishment request message to the central unit, where the interface establishment request message is used to request to establish a connection between the distributed unit and the central unit; and that a distributed unit receives first information sent by a central unit includes: the distributed unit receives the first information by using an interface establishment response message, where the interface establishment response message is used to respond to the interface establishment request message, and the interface establishment response message includes the first information.

With reference to the first aspect, in a possible implementation, that a distributed unit receives first information sent by a central unit includes: The distributed unit receives the first information by using a second update request message, where the second update request message includes the first information.

With reference to the first aspect, in a possible implementation, the PCI conflict information includes at least one of the following: an identifier of a PCI with a PCI conflict, an identifier of a cell with a PCI conflict, a type of a PCI conflict, frequency information of a cell with a PCI conflict, and an identifier of a neighbor access network device with a PCI conflict.

According to a second aspect, a communication method is provided. The method includes: A central unit determines first information, where the first information includes at least one of the following: allowed physical cell identifier PCI information, unallowed PCI information, or PCI conflict information; and the central unit sends the first information to a distributed unit.

In this embodiment of this application, the central unit sends the first information to the distributed unit, and the first information is used to indicate the allowed PCI information, the unallowed PCI information, or the PCI conflict information, so that the distributed unit determines a PCI of a serving cell of the distributed unit based on the first information. In this way, a PCI allocation and optimization solution can be provided, to improve PCI allocation efficiency.

With reference to the second aspect, in a possible implementation, the method further includes: The central unit receives third information from the distributed unit, where the third information includes the initial configured PCI information or updated configured PCI information.

In this embodiment of this application, the distributed unit sends the third information to the central unit, and the third information is used to indicate the initial configured PCI information or the updated configured PCI information configured for the distributed unit, so that the central unit determines, based on the third information, the first information to be sent to the distributed unit. In this way, a PCI allocation and optimization solution can be provided, to improve the PCI allocation efficiency.

With reference to the second aspect, in a possible implementation, the method further includes: The central unit receives an interface establishment request message from the distributed unit, where the interface establishment request message is used to request to establish a connection between the distributed unit and the central unit; and that the central unit sends the first information to a distributed unit includes: the central unit sends the first information by using an interface establishment response message, where the interface establishment response message is used to respond to the interface establishment request message, and the interface establishment response message includes the first information.

With reference to the second aspect, in a possible implementation, that a distributed unit receives first information sent by a central unit includes: The central unit sends the first information by using a second update request message, where the second update request message includes the first information.

With reference to the second aspect, in a possible implementation, the PCI conflict information includes at least one of the following: an identifier of a PCI with a PCI conflict, an identifier of a cell with a PCI conflict, a type of a PCI conflict, frequency information of a cell with a PCI conflict, and an identifier of a neighbor access network device with a PCI conflict.

According to a third aspect, a communication method is provided. The method includes: A network management device receives second information from a distributed unit, where the second information includes at least one of the following: allowed physical cell identifier PCI information, unallowed PCI information, or PCI conflict information; and the network management device sends PCI allocation information to the distributed unit, where the PCI allocation information is used to indicate a PCI allocated to a serving cell of the distributed unit.

In this embodiment of this application, the distributed unit sends the second information to the network management device, and the second information includes all or a part of the first information, so that the network management device determines, based on the second information, a PCI of each serving cell of the distributed unit. In this way, a PCI allocation and optimization solution can be provided, to improve PCI allocation efficiency.

With reference to the third aspect, in a possible implementation, the PCI conflict information includes at least one of the following: an identifier of a PCI with a PCI conflict, an identifier of a cell with a PCI conflict, a type of a PCI conflict, frequency information of a cell with a PCI conflict, and an identifier of a neighbor access network device with a PCI conflict.

According to a fourth aspect, a communication method is provided. The method includes: A network management device receives a first update request message from a distributed unit, where the first update request message is used to request to update configured PCI information; and the network management device sends updated configured PCI information to the distributed unit.

In this embodiment of this application, the network management device sends the updated configured PCI information to the distributed unit based on the first update request message sent by the distributed unit, so that the distributed unit allocates a PCI to a serving cell of the distributed unit. In this way, a PCI allocation and optimization solution can be provided, to improve PCI allocation efficiency.

According to a fifth aspect, a communication method is provided. The method includes: A central unit determines a PCI of a serving cell of a distributed unit; and the central unit sends PCI allocation information to the distributed unit, where the PCI allocation information is used to indicate the PCI allocated to the serving cell of the distributed unit.

In this embodiment of this application, the central unit may be responsible for allocating a PCI to each serving cell in the distributed unit, and sending the PCI allocation information to the distributed unit, so that a PCI allocation and optimization solution can be provided, to improve PCI allocation efficiency.

With reference to the fifth aspect, in a possible implementation, the method further includes: The central unit receives PCI allocation assistance information from the distributed unit, where the PCI allocation assistance information includes at least one of the following: allowed PCI information, PCI optimization priority information, or PCI value range information.

In this embodiment of this application, the central unit may obtain the PCI allocation assistance information from the distributed unit or a network management device, and perform PCI allocation by using the PCI allocation assistance information, so that efficiency of allocating the PCI by the central unit can be improved. For example, allocation of a conflicting PCI can be avoided.

With reference to the fifth aspect, in a possible implementation, that a central unit determines a PCI of a serving cell of a distributed unit includes: The central unit determines the PCI of the serving cell of the distributed unit based on the PCI allocation assistance information.

With reference to the fifth aspect, in a possible implementation, that a central unit determines a PCI of a serving cell of a distributed unit includes: When a PCI conflict occurs in a first cell served by the distributed unit, the central unit re-determines a PCI of the first cell.

With reference to the fifth aspect, in a possible implementation, the method further includes: The central unit receives an interface establishment request message sent by the distributed unit, where the interface establishment request message is used to request to establish a connection between the distributed unit and the central unit; and that the central unit sends PCI allocation information to the distributed unit includes: the central unit sends the PCI allocation information to the distributed unit by using an interface establishment response message, where the interface establishment response message is used to respond to the interface establishment request message, and the interface establishment response message includes the PCI allocation information.

With reference to the fifth aspect, in a possible implementation, that the central unit sends PCI allocation information to the distributed unit includes: The central unit sends the PCI allocation information by using a configuration update message, where the configuration update message is used to indicate to update the PCI of the serving cell of the distributed unit, and the configuration update message includes the PCI allocation information.

According to a sixth aspect, a communication method is provided. The method includes: A distributed unit receives PCI allocation information from a central unit, where the PCI allocation information is used to indicate a PCI allocated to a serving cell of the distributed unit; and the distributed unit allocates the PCI to the serving cell of the distributed unit based on the PCI allocation information.

In this embodiment of this application, the central unit may be responsible for allocating a PCI to each serving cell in the distributed unit, and sending the PCI allocation information to the distributed unit, so that a PCI allocation and optimization solution can be provided, to improve PCI allocation efficiency.

With reference to the sixth aspect, in a possible implementation, the method further includes: The distributed unit sends PCI allocation assistance information to the central unit, where the PCI allocation assistance information includes at least one of the following: allowed PCI information, PCI optimization priority information, or PCI value range information.

In this embodiment of this application, the distributed unit may send the PCI allocation assistance information to the central unit, and perform PCI allocation by using the PCI allocation assistance information, so that efficiency of allocating the PCI by the central unit can be improved. For example, allocation of a conflicting PCI can be avoided.

With reference to the sixth aspect, in a possible implementation, that a distributed unit receives PCI allocation information from a central unit includes: The distributed unit receives the PCI allocation information by using a configuration update message, where the configuration update message is used to indicate to update the PCI of the serving cell of the distributed unit, and the configuration update message includes the PCI allocation information.

According to a seventh aspect, an apparatus is provided. The apparatus is a distributed unit and has functions of implementing the method according to the first aspect or the sixth aspect. These functions may be implemented by hardware, or may be implemented by hardware executing corresponding software. The hardware or the software includes one or more units corresponding to the foregoing functions.

According to an eighth aspect, an apparatus is provided. The apparatus is a central unit and has functions of implementing the method according to the second aspect or the fifth aspect. These functions may be implemented by hardware, or may be implemented by hardware executing corresponding software. The hardware or the software includes one or more units corresponding to the foregoing functions.

According to a ninth aspect, an apparatus is provided. The apparatus is a network management device and has functions of implementing the method according to the third aspect or the fourth aspect. These functions may be implemented by hardware, or may be implemented by hardware executing corresponding software. The hardware or the software includes one or more units corresponding to the foregoing functions.

According to a tenth aspect, an apparatus is provided. The apparatus is a distributed unit. The apparatus includes a memory, a communications interface, and a processor. The memory is configured to store a computer program or instructions. The processor is coupled to the memory and the communications interface. When the processor executes the computer program or the instructions, the apparatus is enabled to perform the method according to the first aspect or the sixth aspect.

According to an eleventh aspect, an apparatus is provided. The apparatus is a central unit. The apparatus includes a memory, a communications interface, and a processor. The memory is configured to store a computer program or instructions. The processor is coupled to the memory and the communications interface. When the processor executes the computer program or the instructions, the apparatus is enabled to perform the method according to the second aspect or the fifth aspect.

According to a twelfth aspect, an apparatus is provided. The apparatus is a network management device. The apparatus includes a memory, a communications interface, and a processor. The memory is configured to store a computer program or instructions. The processor is coupled to the memory and the communications interface. When the processor executes the computer program or the instructions, the apparatus is enabled to perform the method according to the third aspect or the fourth aspect.

According to a thirteenth aspect, a computer program product is provided. The computer program product includes computer program code; and when the computer program code is run on a computer, the computer is enabled to perform the method according to the first aspect or the sixth aspect.

According to a fourteenth aspect, a computer program product is provided. The computer program product includes computer program code; and when the computer program code is run on a computer, the computer is enabled to perform the method according to the second aspect or the fifth aspect.

According to a fifteenth aspect, a computer program product is provided. The computer program product includes computer program code; and when the computer program code is run on a computer, the computer is enabled to perform the method according to the third aspect or the fourth aspect.

According to a sixteenth aspect, this application provides a computer-readable storage medium. The computer-readable storage medium stores a computer program; and when the computer program is run, the method according to the first aspect or the sixth aspect is implemented.

According to a seventeenth aspect, this application provides a computer-readable storage medium. The computer-readable storage medium stores a computer program; and when the computer program is run, the method according to the second aspect or the fifth aspect is implemented.

According to an eighteenth aspect, this application provides a computer-readable storage medium. The computer-readable storage medium stores a computer program; and when the computer program is run, the method according to the third aspect or the fourth aspect is implemented.

DESCRIPTION OF EMBODIMENTS

Figure 1:
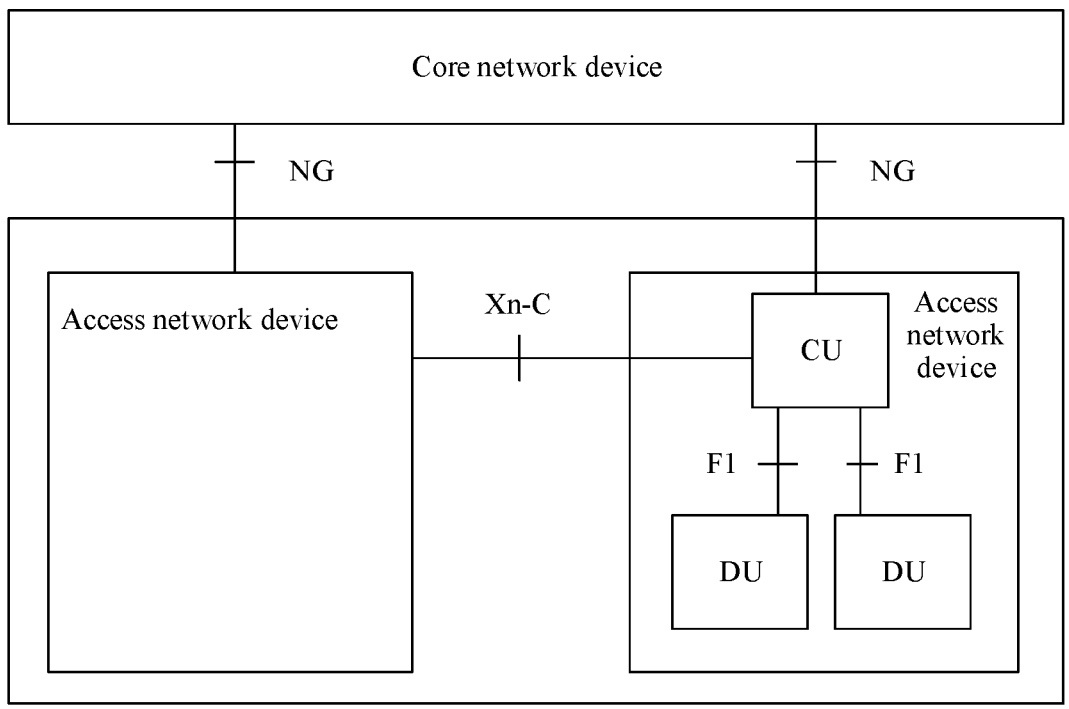
FIG. 1 is a diagram of a CU-DU architecture according to an embodiment of this application.

The following describes technical solutions of this application with reference to the accompanying drawings.

The technical solutions of embodiments of this application may be applied to various communications systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

An access network device in the embodiments of this application may be a device configured to communicate with the terminal device. The access network device may be a base transceiver station (BTS) in a global system for mobile communications (GSM) system or a code division multiple access (CDMA) system, a NodeB (NB) in a wideband code division multiple access (WCDMA) system, an evolved NodeB (eNB or eNodeB) in an LTE system, or a radio controller in a cloud radio access network (CRAN) scenario. Alternatively, the access network device may be a relay node, an access point, a vehicle-mounted device, a wearable device, an access network device in a future 5G network, an access network device in a future evolved PLMN network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more of computer operating systems, for example, a Linux operating system, a Unix operating system, an Android operating system, an iOS operating system, or a Windows operating system, that implement service processing through a process. The application layer includes applications such as a browser, an address book, word processing software, and instant communications software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by the terminal device, the network device, or a functional module that is in the terminal device or the network device and that can invoke and execute the program.

FIG. 1 is a diagram of a CU-DU architecture according to an embodiment of this application. As shown in FIG. 1, in the CU-DU architecture, an access network device (for example, a gNB shown in FIG. 1) is divided into two parts, namely, a CU and a DU, based on protocol stack functions. The CU may include functions at higher layers such as a service data adaptation protocol (SDAP) layer, a packet data convergence protocol (PDCP) layer, and a radio resource control (RRC) layer. The DU may include protocol stack functions at bottom layers, for example, functions at bottom layers such as a radio link control (RLC) protocol layer, a physical layer (PHY), and a media access control (MAC) layer. It may be understood that division of protocol stacks of the CU and the DU is not limited to the foregoing forms. For example, the CU may include an SDAP layer protocol stack function, a PDCP layer protocol stack function, an RRC layer protocol stack function, and an RLC layer protocol stack function, and the DU may include a MAC layer protocol stack function and a PHY layer protocol stack function.

The CU is connected to the DU through a communications interface. The CU is also connected to a core network device through a communications interface. In this embodiment of this application, the communications interface between the CU and the DU may be referred to as an F1 interface. The interface between the CU and the core network device may be referred to as an NG interface. An interface between the CU and another access network device may be referred to as an Xn-C interface, an Xn interface, or an X2 interface. As shown in FIG. 1, one access network device may include one CU and one or more DUs. The CU and DU are connected through the F1 interface. One DU is usually connected to only one CU, and one CU may be connected to one or more DUs. Alternatively, during specific implementation, in consideration of system stability, one DU may be connected to a plurality of CUs.

Figure 2:
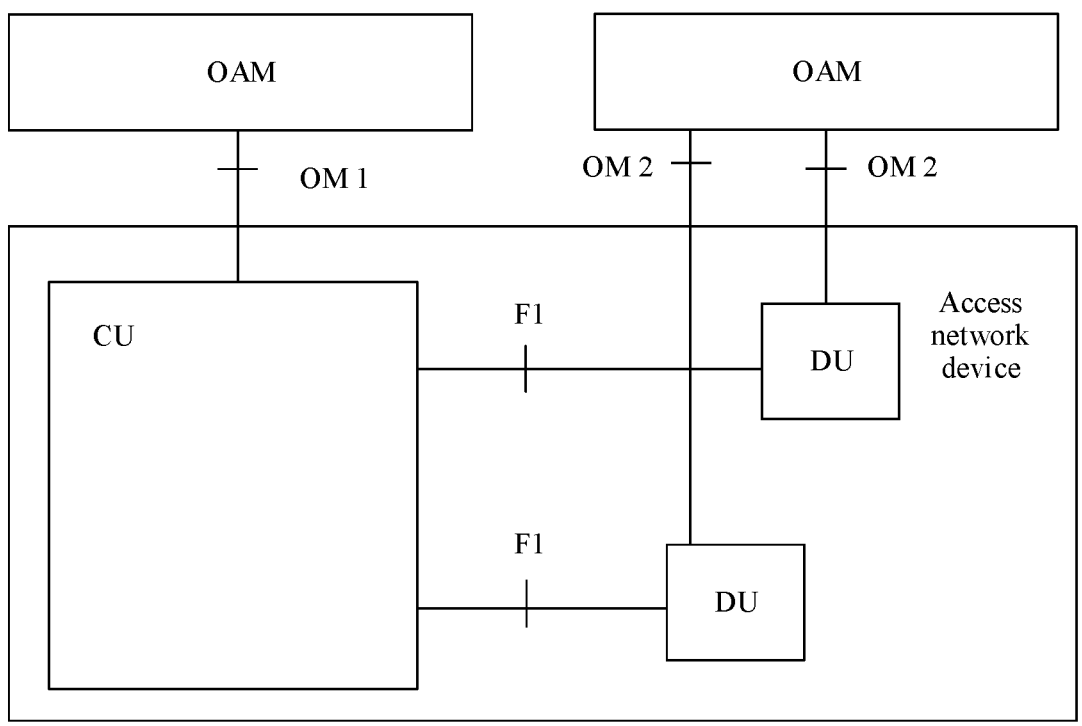
FIG. 2 is a schematic structural diagram of an OAM and CU-DU architecture according to an embodiment of this application.

FIG. 2 is a schematic structural diagram of an operation, administration, and maintenance (OAM) and CU-DU architecture according to an embodiment of this application. As shown in FIG. 2, a CU may be connected to an OAM through a first communications interface, and a DU may be connected to an OAM through a second communications interface. Optionally, the first communications interface may be represented by an OM 1, and the second communications interface may be represented by an OM 2. A representation manner of the first communications interface and the second communications interface is not limited in this application, and another representation manner may also be used for the foregoing communications interfaces. Optionally, the CU and the DU may be connected to a same OAM, or may be connected to different OAMs. For example, the CU and the DU may belong to different vendors, and respectively correspond to different OAMs.

For ease of understanding, the following describes several terms that may be used in the embodiments of this application.

PCI conflict: There are two types of PCI conflicts: a PCI collision and a PCI confusion.

Figure 3:
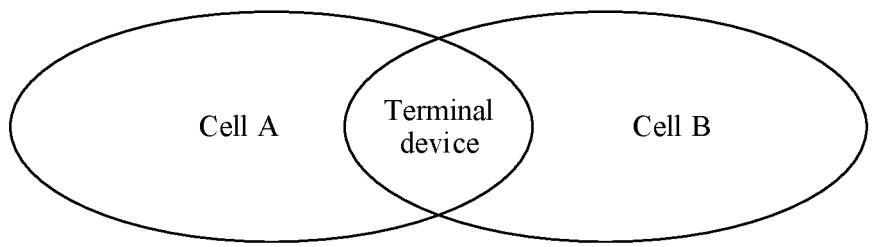
FIG. 3 is a schematic diagram of a PCI collision scenario according to an embodiment of this application.

PCI collision: When geographical isolation between two or more cells that have a same frequency and PCI is excessively small, a terminal device cannot normally implement signal synchronization and demodulation in a signal overlapping area of the two or more cells. This type of PCI conflict is referred to as the PCI collision. For example, FIG. 3 shows a case of a PCI collision according to an embodiment of this application. A cell A and a cell B that have a same frequency and PCI have a signal overlapping area. Therefore, a PCI collision occurs between the cell A and the cell B.

PCI confusion: When a measured cell satisfies a handover condition, if the measured cell and a neighbor cell of a serving cell have a same frequency and PCI, a handover failure or a call drop of a terminal device may be caused. This type of conflict is referred to as the PCI confusion.

Figure 4:
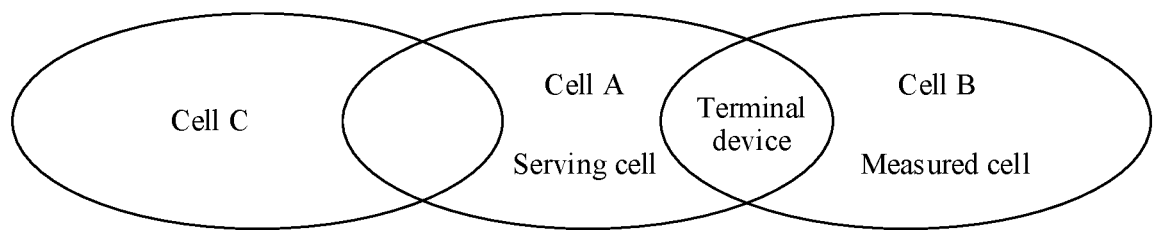
FIG. 4 is a schematic diagram of a PCI confusion scenario according to an embodiment of this application.
Figure 5:
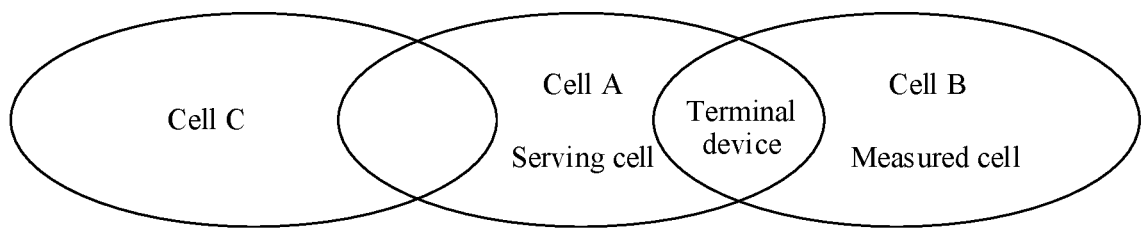
FIG. 5 is a schematic diagram of a PCI confusion scenario according to another embodiment of this application.

The PCI confusion includes the following two cases. In the first case, the measured cell is a configured neighbor cell of the serving cell. In the second case, the measured cell is not a configured neighbor cell of the serving cell. FIG. 4 and FIG. 5 respectively show the foregoing two cases of the PCI confusion. As shown in FIG. 4, in the first case, a measured cell B and a measured cell C are cells that have a same frequency and PCI. The measured cell B that satisfies a handover condition is a configured neighbor cell of a serving cell A. If the terminal device does not support an automatic neighbor relation (ANR) function or an access network device does not enable an ANR function, after the terminal device reports the measured cell B to the access network device, the access network device cannot distinguish whether a neighbor cell measured by the terminal device is the cell B or the cell C. Consequently, the cell A does not initiate a handover or causes a call drop.

As shown in FIG. 5, in the second case, a measured cell B and a measured cell C are cells that have a same frequency and PCI. The measured cell B that satisfies a handover condition is not a configured neighbor cell of a serving cell A. An access network device mistakenly considers that the terminal device detects the neighbor cell C of the serving cell through measurement, and therefore initiates a handover to the cell C. In this case, because an actual location of the terminal device is in a coverage area of the cell B, if a current area in which the terminal device is located is not covered by a signal of the cell C, a cell handover failure may be caused.

Automatic neighbor relation (ANR): At least one of the following operations can be performed: discovering and adding a neighbor cell, identifying and deleting an incorrectly configured neighbor cell or a redundant neighbor cell, and optimizing a neighbor cell attribute. The automatic neighbor relation can be used in a self-organizing network as a self-configuration function.

PCI collision detection manner: The access network device detects whether local cells have a same frequency and PCI, and detects whether a local cell and an external cell that is in a neighbor cell list (NCL) have a same frequency and PCI. If the foregoing cases exist, the access network device detects the PCI collision. The NCL may also have another name, for example, an external cell list, and records basic information of a nearby neighbor cell, but does not include a cell in the access network device. The NCL may include, for example, a cell global identifier (CGI), a PCI, and a base station color code.

PCI confusion detection manner: The access network device detects whether two or more neighbor cells have a same frequency and PCI in a neighbor relation table (NRT) of the serving cell. If the foregoing case exists, the access network device detects the PCI confusion. The NRT records a neighbor relation between the cell and another cell. The NRT may include, for example, a local cell identifier, a PLMN ID of an operator to which a target cell belongs, a neighbor cell ID of a target cell, or a target cell ID.

Trigger condition for detecting the PCI conflict: When a parameter related to the PCI conflict changes, the access network device is triggered to perform PCI conflict detection. The parameter related to the PCI conflict includes at least one of the following: a local cell is added or deleted, or a PCI/frequency of a local cell changes; an external cell is added to or deleted from the NCL, or a PCI/frequency of an external cell in the NCL changes; or a neighbor cell is added to or deleted from the NRT, or a PCI/frequency of a neighbor cell in the NRT changes.

Specifically, the trigger condition of the PCI conflict includes three cases. The first case is manually-triggered PCI conflict detection. For example, PCI conflict detection is triggered when the foregoing parameter changes due to manual modification of a network element parameter. The second case is PCI conflict detection that is based on an ANR. To be specific, the access network device automatically maintains a neighbor cell relation by using an ANR function, and this causes the foregoing parameter to change, thereby triggering the PCI conflict detection. The third case is PCI conflict detection that is based on an Xn/X2 message, and Xn/X2 refers to a communications interface between access network devices. The access network devices exchange information by using the Xn/X2 message and update neighbor cell parameters of the access network devices to trigger the PCI conflict detection. For example, after receiving an X2 message sent by a second access network device, a first access network device adds all serving cells of the second access network device to an NCL of the first access network device, to trigger the PCI conflict detection. Alternatively, when the first access network device adds or deletes a cell, or a PCI/frequency of a configured cell changes, the change is notified to the second access network device through an X2 interface, and the second access network device adds or deletes an external cell or a neighbor cell in an NCL/NRT, or updates a parameter of a configured neighbor cell in the NCL/NRT, to trigger the PCI conflict detection.

PCI allocation manner in the CU-DU architecture: In the CU-DU architecture, the network management device may configure an available PCI list for the DU. The network management device may be an operation, administration, and maintenance (OAM) device. The configuration manner may include three forms. In the first form, the OAM may configure one corresponding PCI list for each cell served by the DU. The DU may select, from the PCI list configured for each cell, a PCI allocated to the cell. For example, the OAM sends information in Table 1 to the DU, to indicate the PCI list allocated to each cell.

TABLE 1

>Cell identifier (Cell ID)
>PCI list (PCI list)

In the second form, the OAM may configure a general PCI list for all cells served by the DU. The DU may determine, based on the general PCI list, an allocated PCI for each cell served by the DU.

In the third form, the OAM may directly allocate one PCI to each cell served by the DU, and the DU does not need to allocate a PCI to the cell.

Figure 6:
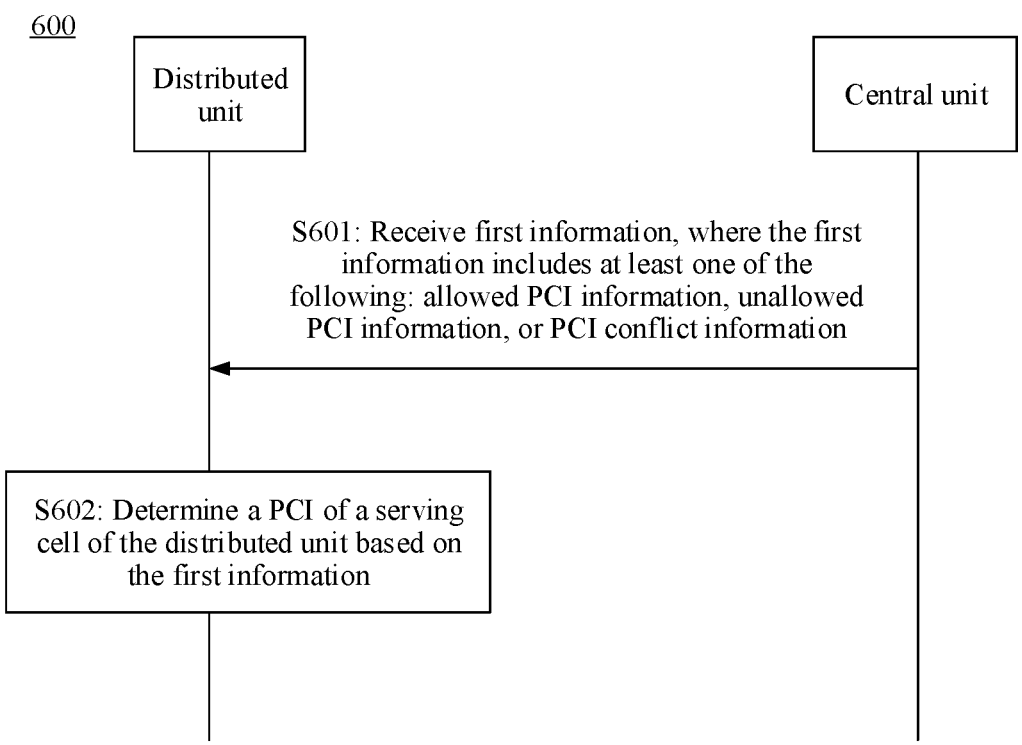
FIG. 6 is a schematic flowchart of a communication method according to an embodiment of this application.

FIG. 6 is a schematic flowchart of a communication method 600 according to an embodiment of this application. The method relates to a central unit, a distributed unit, and a network management device. As shown in FIG. 6, this embodiment of this application provides the communication method. The method includes the following steps.

S601: The central unit sends first information to the distributed unit, and correspondingly the distributed unit receives the first information sent by the central unit, where the first information includes at least one of the following: allowed PCI information, unallowed PCI information, or PCI conflict information.

The distributed unit may be a DU, and the central unit may be a CU.

Optionally, the allowed PCI information may indicate information about a PCI recommended by the CU or information about an available PCI. The unallowed PCI information may refer to information about an unrecommended or an unavailable PCI.

In some examples, the allowed PCI information may include an allowed PCI list. The allowed PCI list may also be referred to as an available PCI list or a recommended PCI list. The unallowed PCI information may include an unallowed PCI list (not allowed PCI list). The unallowed PCI list may also be referred to as an unavailable PCI list or a precluded PCI list.

The allowed PCI information or the unallowed PCI information may be PCI information provided for each cell served by the DU, or may be PCI information provided for all cells served by the DU. The DU may effectively avoid a PCI conflict by using the allowed PCI information or by precluding the unallowed PCI information.

In an example, the allowed PCI information may include a PCI recommended by the CU for a serving cell, with a PCI conflict, that is of the DU, to be used by the DU for PCI reallocation to the serving cell with the conflict. The CU has more comprehensive information, for example, a neighbor cell list. Therefore, the PCI recommended by the CU may be more accurate, to avoid a signaling waste caused by a conflict with the PCI reallocated by the DU.

In some examples, the CU may obtain the unallowed PCI information in at least one of the following manners: based on a PCI reported by a terminal device, by using a PCI obtained from a neighbor access network device through an Xn/X2 interface, or by using a PCI obtained from an air interface side through a downlink receiver. Alternatively, the unallowed PCI information may be obtained in another manner.

In some examples, the CU may obtain currently configured PCI information of the serving cell of the DU, and after the unallowed PCI information is precluded, remaining PCI information is sent to the CU as the allowed PCI information. The currently configured PCI information of the serving cell of the DU may include a PCI list configured for the serving cell of the DU.

Optionally, the PCI conflict information may include information related to the PCI conflict of the serving cell of the distributed unit. For example, the PCI conflict information may include at least one of the following: an identifier of a PCI with a PCI conflict, an identifier of a cell with a PCI conflict, a type of a PCI conflict, frequency information of a cell with a PCI conflict, and an identifier of a neighbor access network device with a PCI conflict.

Optionally, the identifier of the cell with the PCI conflict may include a cell identifier or a cell global identifier (CGI), where the CGI may indicate a cell identifier and an access network device identifier (or a base station identifier).

The PCI conflict usually refers to a PCI conflict between the serving cell of the DU and a cell of a neighbor base station. Therefore, the identifier of the cell with the PCI conflict includes three representation manners. In the first manner, the identifier of the cell with the PCI conflict may include an identifier of the serving cell, with a PCI conflict, that is of the DU. In the second manner, the identifier of the cell with the PCI conflict may include a cell identifier of a neighbor cell with a PCI conflict. In the third manner, the identifier of the cell with the PCI conflict may include an identifier of the serving cell, with a PCI conflict, that is of the DU and a cell identifier of a neighbor cell with a PCI conflict.

In an example, the PCI conflict information may include at least one of the PCI with the conflict or a cell identifier of a cell #1 with a conflict. The cell #1 is the serving cell of the DU. If only a cell identifier of the cell #1 is included and the PCI is not included, the DU may determine a conflicting PCI based on the PCI previously configured for the cell #1. If only a conflicting PCI is included and a cell identifier of the cell #1 is not included, the DU may determine, based on previous configuration information, the cell identifier of the cell #1 corresponding to the conflicting PCI. Certainly, in this case, a prerequisite is that all serving cells of the DU are in a one-to-one correspondence with PCIs. Otherwise, a confusion is caused. Therefore, in an example, the PCI conflict information may include both the PCI with the conflict and the cell identifier of the cell #1 with the conflict.

In some examples, the PCI conflict information may include uplink and/or downlink frequency information of the cell with the PCI conflict, and the information may be used to quickly locate the cell with PCI conflict. For example, the DU may forward the PCI conflict information to an OAM, and the OAM locates the cell with the PCI conflict.

Optionally, the type of the PCI conflict means that the PCI conflict is a PCI collision or a PCI confusion, or both types exist. A purpose of carrying the type of the PCI conflict in the PCI conflict information may be to instruct PCI reallocation.

In some examples, the identifier of the neighbor access network device with the PCI conflict may refer to, for example, an identifier of a neighbor cell CU with a PCI conflict, or an identifier of a neighbor base station with a PCI conflict.

Optionally, there are two indication manners for the allowed PCI information or the unallowed PCI information. In the first manner, the first information may indicate all unallowed PCI information or allowed PCI information. For example, the first information includes all unavailable PCIS or recommended PCIS. In the second manner, a differentiated manner may be used, provided that, based on existing configured PCI information, an unavailable PCI or a recommended PCI that needs to be added is indicated, or an unavailable PCI or a recommended PCI that needs to be reduced is indicated.

S602: The distributed unit determines the PCI of the serving cell of the distributed unit based on the first information.

Optionally, the distributed unit may determine the PCI of the serving cell in two forms. In the first form, the distributed unit determines the PCI of the serving cell of the distributed unit based on configured PCI information and the first information. The configured PCI information may refer to a PCI list configured for the distributed unit. The configured PCI information may be obtained from the network management device, or may be configured in another manner. This is not limited in this embodiment of this application. The network management device may be an OAM, or may be a network management device of another type. For example, based on the configured PCI list, the DU may preclude the unallowed PCI indicated in the first information, and then determine, in remaining PCIS, a PCI of each cell served by the DU. Alternatively, the DU may determine, in the allowed PCI list indicated by the first information, a PCI of each cell served by the DU.

Optionally, if the distributed unit discovers that all PCIS or most PCIS in the currently configured PCI list are the unallowed PCI information, the distributed unit may request the network management device to update the configured PCI list. For example, the distributed unit sends a first update request message to the network management device, where the first update request message is used to request to update the configured PCI information. The distributed unit receives updated configured PCI information from the network management device. Optionally, the first update request message may have another name, for example, an update indication message.

In the second form, the network management device may directly allocate a PCI to each serving cell of the distributed unit, and the distributed unit does not need to perform allocation. The distributed unit may send second information to the network management device, and the second information may include all or a part of information in the first information, so that the network management device may send, to the distributed unit based on the second information, the PCI allocated to the serving cell of the distributed unit. In some examples, the distributed unit sends the second information to the network management device, where the second information includes all or the part of the first information. The distributed unit receives PCI allocation information sent by the network management device, where the PCI allocation information is used to indicate the PCI allocated to the serving cell of the distributed unit. Optionally, the second information may be carried in a plurality of types of messages. For example, the second information may be carried in PCI conflict report information sent by the CU to the OAM.

Optionally, that the distributed unit determines the PCI of the serving cell of the distributed unit may include that the distributed unit updates the PCI of the serving cell, or modifies the PCI of the serving cell with the PCI conflict.

In this embodiment of this application, the central unit sends the first information to the distributed unit, and the first information is used to indicate the allowed PCI information, the unallowed PCI information, or the PCI conflict information, so that the distributed unit determines the PCI of the serving cell of the distributed unit based on the first information. In this way, a PCI allocation and optimization solution can be provided, to improve PCI allocation efficiency.

Optionally, the first information may be carried in a plurality of types of messages. For example, the first information may be carried in an interface establishment response message sent by the CU to the DU. The interface establishment response message is used to respond to an interface establishment request message, and the interface establishment request message is used to request to establish a connection between the distributed unit and the central unit. The interface establishment response message may be an F1 interface establishment response message. An F1 interface is a communications interface between the CU and the DU. Alternatively, the first information may be carried in a second update request message sent by the CU to the DU, and the second update request message is used to request the DU to update related configuration information of the DU. The second update request message may have another name, for example, may be referred to as a configuration update request message or a CU configuration update request message, or may be referred to as a CU configuration update message, a PCI configuration update message, a PCI conflict report message, a PCI modification request message, or the like. Alternatively, the first information may be carried in a DU configuration update response message sent by the CU to the DU. The second update request message may be triggered under some conditions. For example, when a neighbor cell is unavailable or a neighbor cell is updated, the second update request message may be triggered.

Optionally, the distributed unit sends third information to the central unit, and correspondingly the central unit receives the third information, where the third information includes the initial configured PCI information or the updated configured PCI information. The configured PCI information may refer to the PCI list configured for the serving cell of the DU. After initially configuring the PCI list or updating the configured PCI list, the DU may send the configured PCI list to the CU. The CU may detect, in the PCI list configured by the DU based on the configured PCI list, whether a PCI conflict occurs or whether there is the unallowed PCI information.

The third information may be carried in a plurality of types of messages. For example, the third information may be carried in the interface establishment request message sent by the DU to the CU, and the interface establishment request message is used to request to establish the connection between the distributed unit and the central unit. The interface establishment request message may be an F1 interface establishment request message. An F1 interface is a communications interface between the CU and the DU. Alternatively, the third information may be carried in a third update request message sent by the DU to the CU, and the third update request message is used to request the CU to update configuration information of the DU. The third update request message may have another name, for example, may also be referred to as a DU configuration update request message or a configuration request message. Alternatively, the third information may be carried in a CU configuration update response message sent by the DU to the CU.

For example, the CU may obtain, by using the F1 interface establishment request message, information about the PCI list configured by the OAM for the DU, and the CU may provide, based on the information about the PCI list, one recommended PCI list for the DU in a subsequent procedure, for example, when a PCI conflict occurs. For example, the CU may recommend available PCI information for the serving cell of the DU based on information such as the PCI list configured by the DU, an unavailable PCI obtained by using an ANR, and a deployment location of the DU. The available PCI information may be a subset of the configured PCI information.

In this embodiment of this application, the distributed unit sends the third information to the central unit, and the third information is used to indicate the initial configured PCI information or the updated configured PCI information configured for the distributed unit, so that the central unit determines, based on the third information, the first information to be sent to the distributed unit. In this way, a PCI allocation and optimization solution can be provided, to improve the PCI allocation efficiency.

Optionally, the distributed unit may send fourth information to the central unit, where the fourth information may include an identifier of the serving cell of the DU and a corresponding PCI. The fourth information may alternatively be carried in the interface establishment request message or the third update request message. For example, the DU may configure one PCI for each serving cell, or the OAM configures a PCI for each serving cell of the DU, and then may include the fourth information in the F1 interface establishment request message, where the fourth information indicates the PCI allocated to the serving cell of the DU. The CU may alternatively detect, based on the fourth information, whether the PCI conflict occurs in the PCI list configured by the DU.

In this embodiment of this application, the distributed unit sends the fourth information to the central unit, and the fourth information is used to indicate an identifier of each serving cell of the distributed unit and a corresponding PCI, so that the central unit determines, based on the fourth information, the first information to be sent to the distributed unit. In this way, a PCI allocation and optimization solution can be provided, to improve the PCI allocation efficiency.

Figure 7:
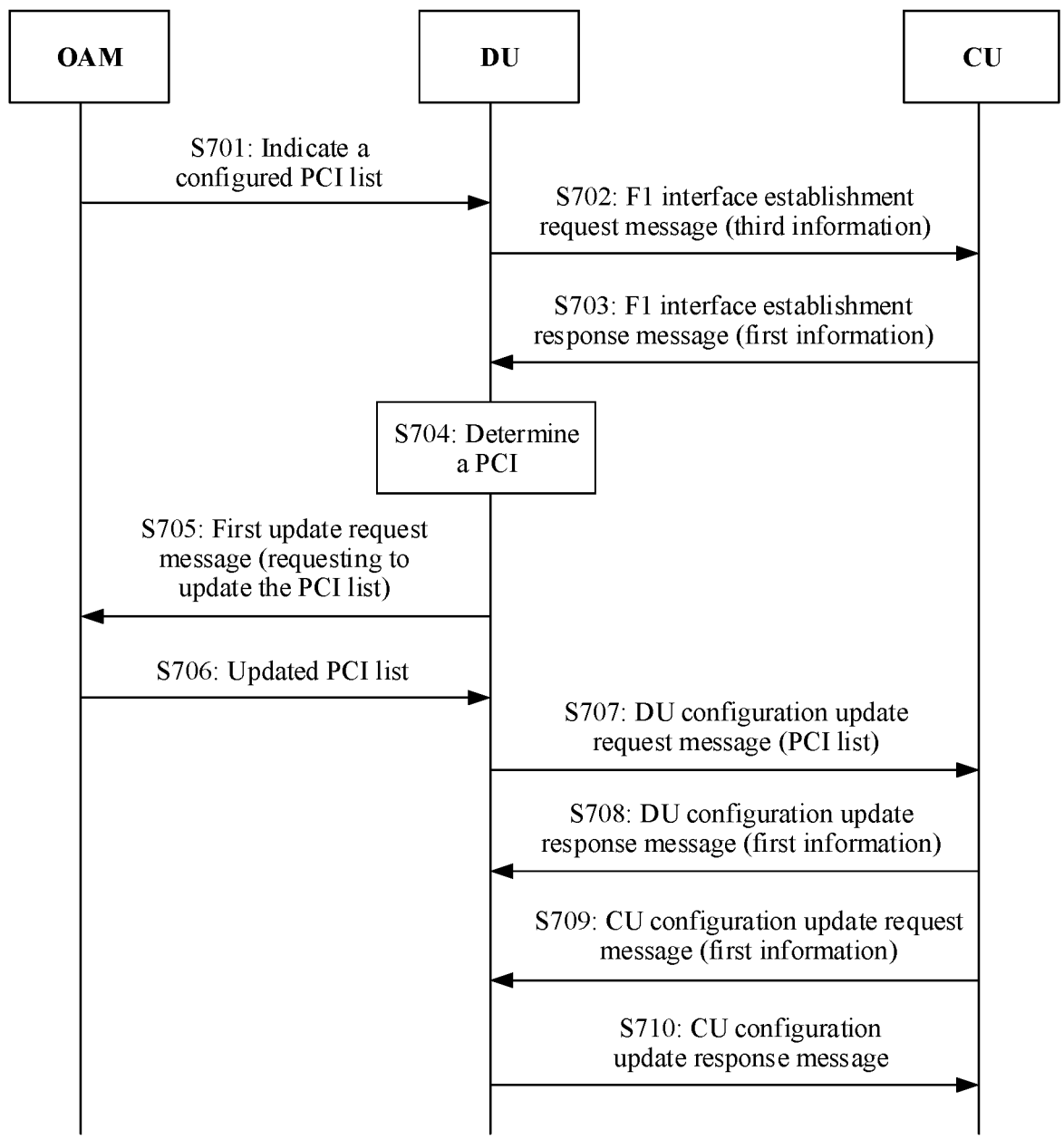
FIG. 7 is a schematic flowchart of a communication method according to another embodiment of this application.

FIG. 7 is a specific schematic flowchart of a communication method 700 according to an embodiment of this application. In FIG. 7, a network management device is an OAM, a central unit is a CU, and a distributed unit is a DU. As shown in FIG. 7, the method includes the following steps.

S701: The OAM configures a PCI list for the DU.

Specifically, the OAM may configure one PCI list for each serving cell of the DU, or may configure PCI lists for all serving cells of the DU. Alternatively, in an alternative manner, the OAM may directly allocate a PCI to each serving cell of the DU.

S702: The DU sends an F1 interface establishment request message to the CU, and correspondingly the CU receives the F1 interface establishment request message.

Optionally, the F1 interface establishment request message may carry third information and/or fourth information. The third information may carry the PCI list configured for the DU. The fourth information may carry the PCI allocated to each serving cell of the DU.

For example, the CU may obtain, by using the F1 interface establishment request message, information about the PCI list configured by the OAM for the DU. In a subsequent procedure, for example, when a PCI conflict occurs, the CU may provide one recommended PCI list for the DU based on the information about the PCI list. The recommended PCI list may be a subset of the configured PCI list. For example, the CU may recommend available PCI information for the serving cell of the DU based on information such as the PCI list configured by the DU, an unavailable PCI obtained by using an ANR, and a deployment location of the DU.

For another example, the DU may configure one PCI for each serving cell, or the OAM configures a PCI for each serving cell of the DU, and then includes, in the F1 interface establishment request message sent to the CU, information indicating the PCI allocated to each serving cell of the DU. The CU may detect, based on the foregoing information, whether a PCI conflict occurs in the PCI list configured by the DU.

S703: The CU sends an F1 interface establishment response message to the DU, and correspondingly the DU receives the F1 interface establishment response message from the CU.

Optionally, the F1 interface establishment response message may include first information. For example, the F1 interface establishment response message may include an unavailable PCI list or an available PCI list.

S704: The DU determines the PCI corresponding to the serving cell.

For example, the DU may determine, based on the unavailable PCI list indicated in the first information obtained in S703 or the recommended PCI list, the PCI corresponding to the serving cell. For example, if a PCI configured by the DU for a serving cell in S702 is included in the unavailable PCI list, the DU needs to reallocate one PCI to the serving cell.

Optionally, after S706, the DU may also determine, based on an updated configured PCI list, the PCI corresponding to the serving cell. Alternatively, the DU may also determine, based on the first information carried in S708 or S709, the PCI corresponding to the serving cell.

S705: Optionally, the DU sends a first update request message to the OAM, and correspondingly the OAM receives the first update request message from the DU, where the first update request message is used to request to update the configured PCI list.

For example, if the DU discovers, based on the first information, that all PCI lists allocated by the OAM in S701 are unavailable, that is, the unavailable PCI list in S703 includes all PCI lists configured for the DU in S701, the DU needs to request the OAM to reallocate the configured PCI list.

Alternatively, in S705, the DU may also trigger, under another condition, sending of the first update request message to the CU. For example, a quantity or proportion of unavailable PCIS in the configured PCI list exceeds a preset threshold.

Optionally, the DU may send an indication for updating the configured PCI list to the OAM only by using the first update request message, and does not need to indicate an available PCI list or an unavailable PCI list to the OAM. Alternatively, the DU may also send an available PCI list, an unavailable PCI list, or PCI conflict information to the OAM by using the first update request message, avoiding a new PCI conflict when the OAM updates the configured PCI list.

S706: After receiving the first update request message, the OAM sends an updated configured PCI list to the DU.

Optionally, the OAM may also allocate one PCI to each serving cell of the DU, and send the allocated PCI to the DU. Alternatively, after obtaining the PCI conflict information, the OAM may reallocate the PCI to the serving cell with the PCI conflict in the DU, and send the reallocated PCI to the DU.

S707: The DU sends a DU configuration update request message to the CU, and correspondingly the CU receives the DU configuration update request message from the DU, where the DU configuration update request message includes the PCI list reallocated by the OAM to the DU.

S708: The CU sends a DU configuration update response message to the DU, and correspondingly the DU receives the DU configuration update response message from the CU.

Optionally, the message may include the first information. For example, the message includes an unallowed PCI list or a recommended PCI list.

Optionally, S707 and S708 may be implemented independently of other previous steps. For example, when the OAM reallocates the PCI list to the DU, steps of S707 and S708 may be triggered regardless of whether the OAM actively initiates a request or passively initiates a request.

The second update request message described above may include the DU configuration update response message in S708.

S709: The CU sends a CU configuration update request message to the DU, and correspondingly the DU receives the CU configuration update request message from the CU.

The CU configuration update request message may include the first information. The CU configuration update request message in S709 may be triggered independently of other previous steps. For example, the CU may discover, by using an ANR, through reporting by a terminal device, or the like, that the unavailable PCI list or the recommended PCI list needs to be updated. For example, if a PCI of a serving cell of a neighbor base station is updated, this step is triggered. The CU configuration update request message may have another name, for example, a PCI configuration update message.

The second update request message described above may include the CU configuration update request message in S709.

S710: The DU sends a CU configuration update response message to the CU, and correspondingly the CU receives the CU configuration update response message from the DU.

Optionally, the CU configuration update response message may also carry the third information or the updated configured PCI list.

Figure 8:
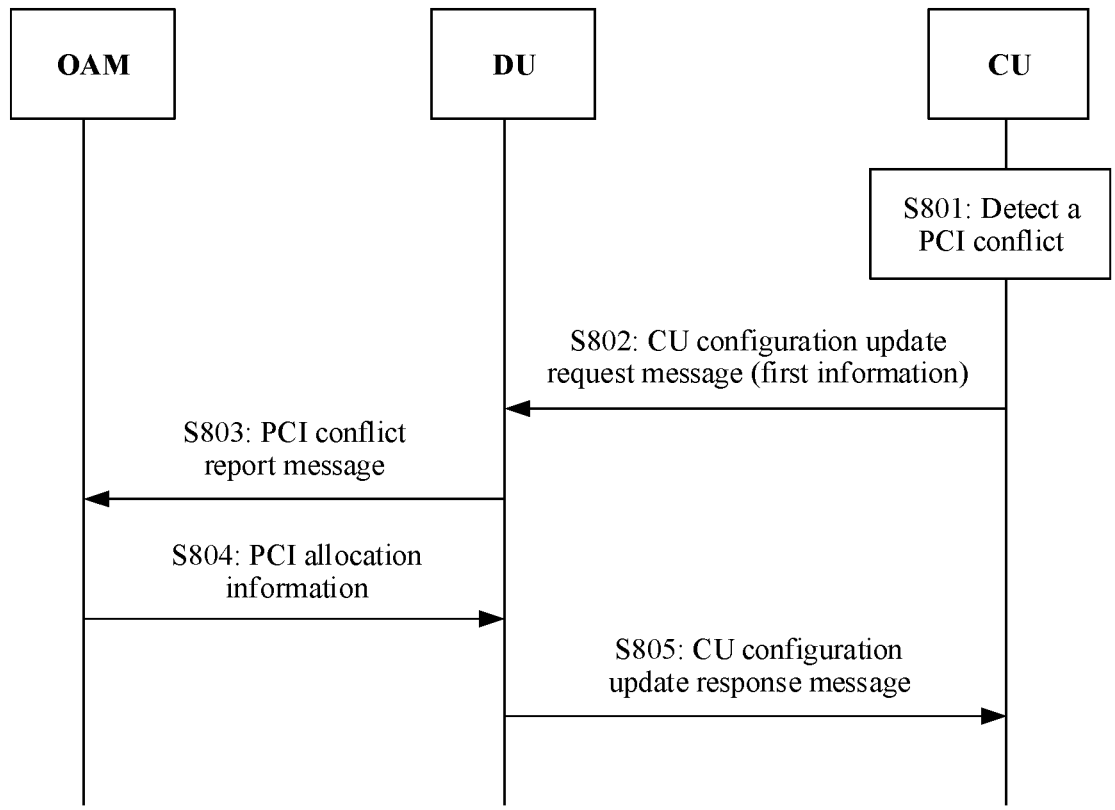
FIG. 8 is a schematic flowchart of a communication method according to another embodiment of this application.

FIG. 8 is a specific schematic flowchart of a communication method 800 according to an embodiment of this application. A network management device may be an OAM in FIG. 8, a central unit may be a CU in FIG. 8, and a distributed unit may be a DU in FIG. 8. The method includes the following steps.

S801: The CU detects a PCI conflict.

For a specific manner of detecting the PCI conflict by the CU, refer to the foregoing related descriptions.

S802: The CU sends a CU configuration update request message to the DU, and correspondingly the DU receives the CU configuration update request message. The CU configuration update request message may include first information, that is, include at least one of the following: allowed PCI information, unallowed PCI information, or PCI conflict information.

Optionally, the CU configuration update request message may have another name, for example, a PCI conflict report message or a PCI modification request message. This is not limited herein.

For example, the CU configuration update request message may include at least one of the following: an identifier of a PCI with a PCI conflict, an identifier of a cell with a PCI conflict, a type of a PCI conflict, frequency information of a cell with a PCI conflict, and an identifier of a neighbor access network device with a PCI conflict.

For another example, the CU configuration update request message may further include a PCI recommended by the CU for a serving cell with a PCI conflict, to be used by the DU for PCI reallocation. The CU usually has more comprehensive information, for example, a neighbor cell list. Therefore, the PCI recommended by the CU may be more accurate, to avoid a signaling waste caused by a conflict with the PCI reallocated by the DU.

S803: The DU sends a PCI conflict report message to the OAM, and correspondingly the OAM receives the PCI conflict report message from the DU.

Optionally, the PCI conflict report message may include second information, where the second information is all or a part of the first information, so that the OAM determines, based on the second information, the PCI reallocated to the serving cell of the DU. For example, the PCI conflict report message may include a recommended PCI list and an unavailable PCI list.

S804: The OAM sends PCI allocation information to the DU, and correspondingly the DU receives the PCI allocation information from the OAM, where the PCI allocation information is used to indicate the PCI allocated by the OAM to the serving cell of the DU.

It may be understood that S803 and S804 are optional steps. After S802, the DU may also autonomously reallocate the PCI to the serving cell with the PCI conflict. For example, based on a configured PCI list, the DU may preclude a conflicting PCI or an unavailable PCI indicated in the first information, and then reallocate the PCI to the serving cell with the PCI conflict.

S805: The DU sends a CU configuration update response message to the CU, and correspondingly the CU receives the CU configuration update response message from the DU.

Optionally, the CU configuration update response message may include updated PCI configuration information. For example, the CU configuration update response message may include the PCI reallocated to the cell with the PCI conflict.

In the communication method described above, the distributed unit or the network management device is responsible for allocating the PCI to the serving cell of the DU. The following describes a method in which a central unit is responsible for allocating a PCI to a serving cell of a DU.

Figure 9:
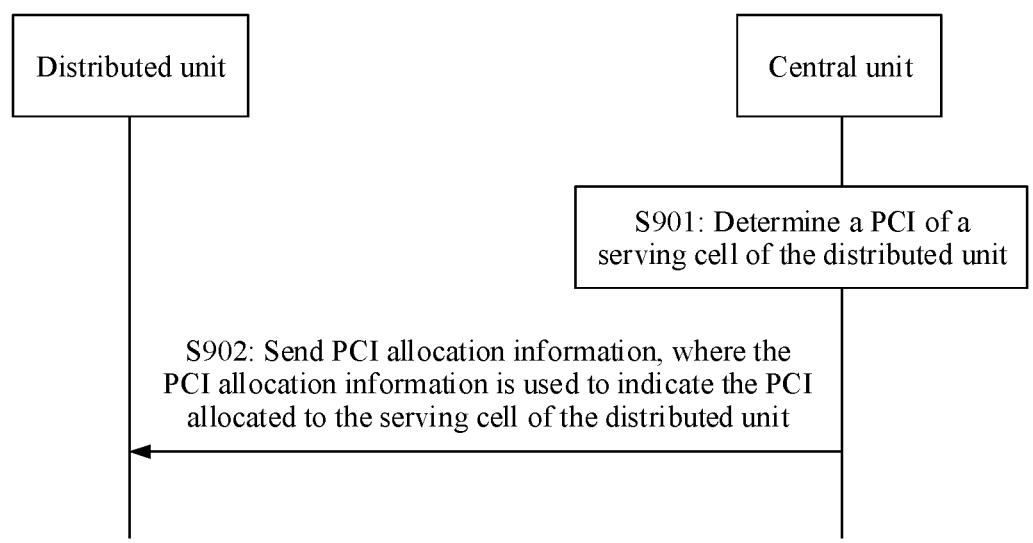
FIG. 9 is a schematic flowchart of a communication method according to another embodiment of this application.

FIG. 9 is a schematic flowchart of a communication method 900 according to another embodiment of this application. The method in FIG. 9 may be performed by a central unit, a distributed unit, and a network management device. As shown in FIG. 9, the method includes the following steps.

S901: The central unit determines a PCI of a serving cell of the distributed unit.

Optionally, the central unit may include a CU, and the distributed unit may include a DU.

That the central unit determines the PCI of the serving cell of the distributed unit may include that the central unit allocates a PCI to each serving cell in the distributed unit, or include that the central unit allocates a PCI to a serving cell with a PCI conflict in the distributed unit. For example, when the central unit determines that a PCI conflict occurs in a first cell served by the distributed unit, the central unit may re-determine the PCI of the first cell.

Optionally, the central unit may determine the PCI of the serving cell of the distributed unit based on PCI allocation assistance information. The PCI allocation assistance information may include at least one of the following: allowed PCI information, PCI optimization priority information, or PCI value range information.

The allowed PCI information may be PCI information configured by the DU or available PCI information. In some examples, the allowed PCI information may include an allowed PCI list. The allowed PCI list may also be referred to as an available PCI list or a recommended PCI list.

The PCI optimization priority information may indicate a PCI optimization priority of the DU or each serving cell of the DU. For example, when the PCI conflict occurs, the CU may determine, based on the optimization priority information, a cell to be preferentially optimized. For example, the CU preferentially changes a PCI for a DU with a high optimization priority or a cell with a high optimization priority of a DU. In a specific example, it is assumed that a PCI conflict occurs between a cell #1 and a cell #2, and if an optimization priority of the cell #1 is higher than an optimization priority of the cell #2, the CU preferentially considers reallocating a PCI of the cell #1, but keeping a PCI of the cell #2 unchanged.

The PCI value range information may be used to indicate a PCI value of a cell served by the DU or a PCI value range of all serving cells served by the DU, so that the CU may perform PCI allocation or optimized reallocation for the serving cells of the DU within the value range.

Optionally, the central unit may receive the PCI allocation assistance information from the network management device. Alternatively, the central unit may receive the PCI allocation assistance information from the distributed unit. For example, the network management device may send the PCI allocation assistance information to the distributed unit, and then the distributed unit sends the PCI allocation assistance information to the central unit. The network management device may be an OAM.

The PCI allocation assistance information may also use other names, for example, PCI optimization assistance information or PCI optimization/allocation assistance information.

In this embodiment of this application, the central unit may obtain the PCI allocation assistance information from the distributed unit or the network management device, and perform PCI allocation by using the PCI allocation assistance information, so that efficiency of allocating the PCI by the central unit can be improved. For example, allocation of a conflicting PCI can be avoided.

S902: The central unit sends PCI allocation information to the distributed unit, where the PCI allocation information is used to indicate the PCI allocated to the serving cell of the distributed unit.

Optionally, the PCI allocation information may be carried in a plurality of types of messages. For example, the PCI allocation information is carried in an interface establishment response message or a configuration update message sent by the central unit to the distributed unit. This is not limited herein.

In an example, the central unit receives an interface establishment request message sent by the distributed unit, where the interface establishment request message is used to request to establish a connection between the distributed unit and the central unit; and that the central unit sends PCI allocation information to the distributed unit includes: the central unit sends the PCI allocation information to the distributed unit by using an interface establishment response message, where the interface establishment response message is used to respond to the interface establishment request message, and the interface establishment response message includes the PCI allocation information.

In another example, the central unit sends the PCI allocation information by using a configuration update message, where the configuration update message is used to indicate to update the PCI of the serving cell of the distributed unit, and the configuration update message includes the PCI allocation information. The configuration update message may also have another name, for example, a PCI modification request message, a PCI modification command message, and a CU configuration update request message.

It may be understood that the PCI allocation information may indicate to allocate a PCI to each serving cell of the DU, or may indicate to allocate a PCI to a cell with a PCI conflict.

It may be understood that the PCI allocation information may include two indication forms. In the first form, the PCI allocation information carries cell identifiers of all serving cells of the DU and corresponding PCIs. In the second form, the PCI allocation information carries only a cell identifier of a cell that needs to be modified and a modified PCI. For example, the DU includes a serving cell #1 and a serving cell #2, a PCI pre-allocated by the OAM or the CU to the serving cell #1 is a first PCI, and a PCI pre-allocated to the serving cell #2 is a second PCI. If the CU discovers that a PCI conflict occurs between the first PCI of the serving cell #2 and a serving cell of a neighbor base station, the CU determines to modify the PCI of the serving cell #2 to a third PCI. In this case, the PCI allocation information may be indicated in two manners. In the first indication manner, the PCI allocation information may carry a cell identifier and the first PCI of the serving cell #1, and a cell identifier and the third PCI of the serving cell #2. In the second indication manner, the PCI allocation information may carry only a cell identifier and the third PCI of the serving cell #2. After receiving the PCI allocation message, the DU may consider by default that the first PCI of the serving cell #1 is allowed and does not need to be modified.

In this embodiment of this application, the central unit may be responsible for allocating a PCI to each serving cell in the distributed unit, and sending the PCI allocation information to the distributed unit, so that a PCI allocation and optimization solution can be provided, to improve PCI allocation efficiency.

Figure 10:
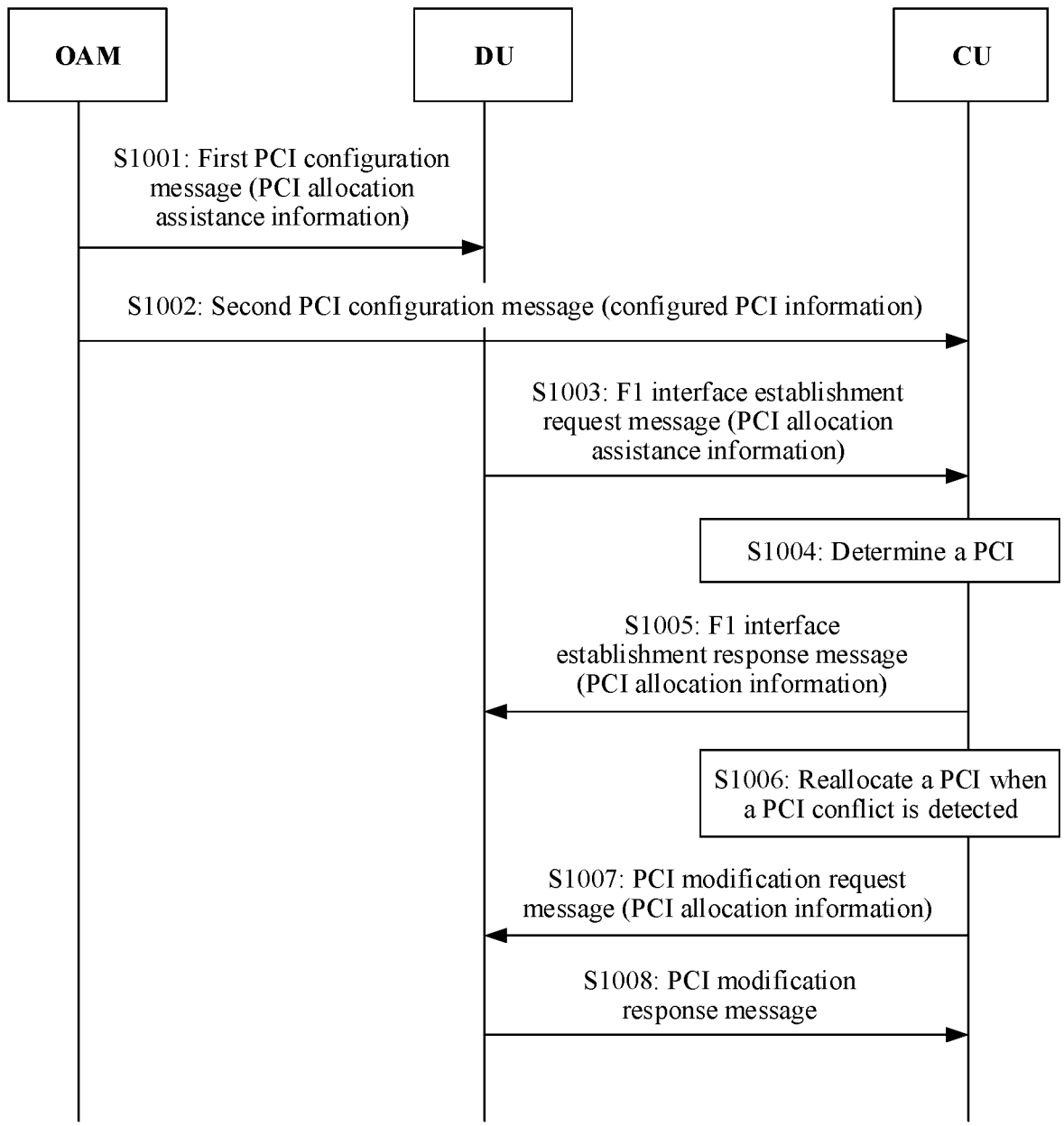
FIG. 10 is a schematic flowchart of a communication method according to another embodiment of this application.

FIG. 10 is a schematic flowchart of a communication method 1000 according to another embodiment of this application. A network management device may be an OAM in FIG. 10, a central unit may be a CU in FIG. 10, and a distributed unit may be a DU in FIG. 10. As shown in FIG. 10, the method includes the following steps.

S1001: The OAM sends a first PCI configuration message to the DU, and correspondingly the DU receives the first PCI configuration message from the OAM.

Optionally, the first PCI configuration message may include PCI allocation assistance information. The PCI allocation assistance information includes at least one of the following: allowed PCI information, PCI optimization priority information, or PCI value range information.

S1002: The OAM sends a second PCI configuration message to the CU, and correspondingly the CU receives the second PCI configuration message from the OAM, where the second PCI configuration message may include configured PCI information.

The configured PCI information may indicate a PCI list configured by the OAM for the CU. For example, the configured PCI list may indicate PCI lists corresponding to all DUs connected to the CU, or indicate a PCI list corresponding to each DU connected to the CU.

It may be understood that the OAM in S1001 and the OAM in S1002 may be a same OAM, or may be two different OAMs. For example, the OAM in S1001 may be referred to as an OAM-DU. The OAM-DU is specially configured to perform OAM configuration on the DU, but is not configured to perform OAM configuration on the CU. The OAM in S1002 may be an OAM-CU. The OAM-CU is specially configured to perform OAM configuration on the CU, but is not configured to perform OAM configuration on the DU.

S1003: The DU sends an F1 interface establishment request message to the CU, and correspondingly the CU receives the F1 interface establishment request message from the DU. Optionally, the F1 interface establishment request message may include the PCI allocation assistance information in S1001.

Alternatively, the CU may also obtain the PCI allocation assistance information in another manner. For example, the CU may also obtain the PCI allocation assistance information from the OAM.

S1004: The CU determines a corresponding PCI for a serving cell of the DU.

For example, the CU may determine a corresponding PCI for each serving cell of the DU. The CU may determine, based on information such as the configured PCI list in S1002, the PCI allocation assistance information in S1003, or an unavailable PCI discovered by using an ANR, the PCI allocated to the serving cell of the DU.

S1005: The CU sends an F1 interface establishment response message to the DU, and correspondingly the DU receives the F1 interface establishment response message from the CU. The F1 interface establishment response message may include PCI allocation information. In S1005, the PCI allocation information is used to indicate a PCI allocated by the CU to each serving cell of the DU. For a specific definition of the PCI allocation information, refer to the related descriptions in the example in FIG. 9.

It should be noted that, after the CU allocates the PCI to each serving cell in the DU, as time goes by, a new base station may be deployed, or a PCI of a serving cell of a neighbor base station may be modified, and consequently a PCI conflict occurs. Therefore, the PCI of the serving cell of the DU needs to be modified in subsequent steps. However, the subsequent steps are not necessarily related to the previous steps, and can be performed independently of the previous steps.

S1006: When detecting that a PCI conflict occurs in the serving cell of the DU, the CU determines to reallocate a PCI to the serving cell with the PCI conflict.

For example, the CU may perform PCI optimization on the serving cell of the DU based on the PCI allocation assistance information, and reallocate a PCI to a conflicting serving cell.

S1007: The CU sends a PCI modification request message to the DU, and correspondingly the DU receives the PCI modification request message from the CU. The PCI modification request message includes the PCI allocation information.

In S1007, the PCI allocation information is used to indicate an identifier of a PCI reallocated to the cell with the PCI conflict.

For example, the PCI allocation information may include a cell identifier of the serving cell with the PCI conflict in the DU and the PCI reallocated by the CU to the serving cell. The cell identifier may be a CGI.

The PCI modification request message may have another name, for example, a configuration update message, a PCI modification command message, or a CU configuration update request message.

S1008: Optionally, the DU sends a PCI modification response message to the CU, and correspondingly the CU receives the PCI modification response message sent by the DU.

The PCI modification response message may be used to confirm that the identifier of the PCI of the serving cell is successfully modified.

The foregoing describes the communication methods in the embodiments of this application with reference to FIG. 1 to FIG. 10. The following continues to describe apparatuses in the embodiments of this application with reference to the accompanying drawings.

Figure 11:
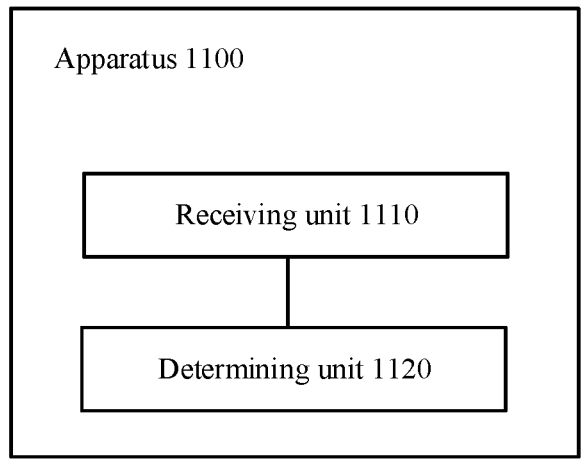
FIG. 11 is a schematic structural diagram of an apparatus according to an embodiment of this application.

FIG. 11 is a schematic structural diagram of an apparatus 1100 according to an embodiment of this application. The apparatus includes units that can implement steps performed by the distributed network element in the foregoing embodiments. For example, the units can perform the methods performed by the distributed unit in FIG. 6 to FIG. 10. The apparatus 1100 includes:

a receiving unit 1110, configured to receive first information sent by a central unit, where the first information includes at least one of the following: allowed physical cell identifier PCI information, unallowed PCI information, or PCI conflict information; and a determining unit 1120, configured to determine a PCI of a serving cell of the distributed unit based on the first information.

Alternatively,
the receiving unit 1110 is configured to receive PCI allocation information, where the PCI allocation information is used to indicate the PCI allocated to the serving cell of the distributed unit; and the determining unit 1120 is configured to allocate the PCI to the serving cell of the distributed unit based on the PCI allocation information.

Figure 12:
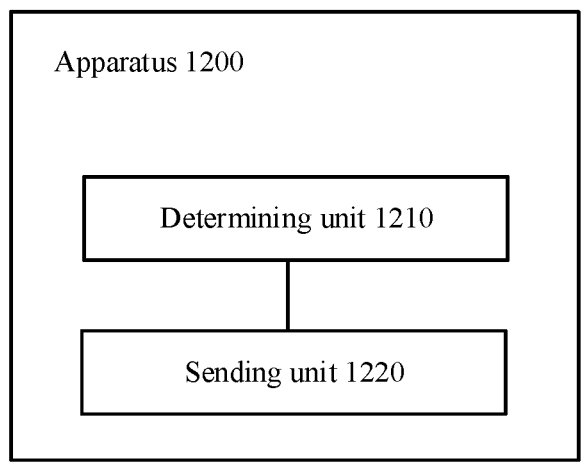
FIG. 12 is a schematic structural diagram of an apparatus according to another embodiment of this application.

FIG. 12 is a schematic structural diagram of an apparatus 1200 according to an embodiment of this application. The apparatus includes units that can implement steps performed by the central network element in the foregoing embodiments. For example, the units can perform the methods performed by the central unit in FIG. 6 to FIG. 10. The apparatus 1200 includes:
- a determining unit 1210, configured to determine first information, where the first information includes at least one of the following: allowed physical cell identifier PCI information, unallowed PCI information, or PCI conflict information; and
- a sending unit 1220, configured to send the first information to a distributed unit.

Alternatively,
the determining unit 1210 is configured to determine a PCI of a serving cell of a distributed unit; and the sending unit 1220 is configured to send PCI allocation information to the distributed unit, where the PCI allocation information is used to indicate the PCI allocated to the serving cell of the distributed unit.

Figure 13:
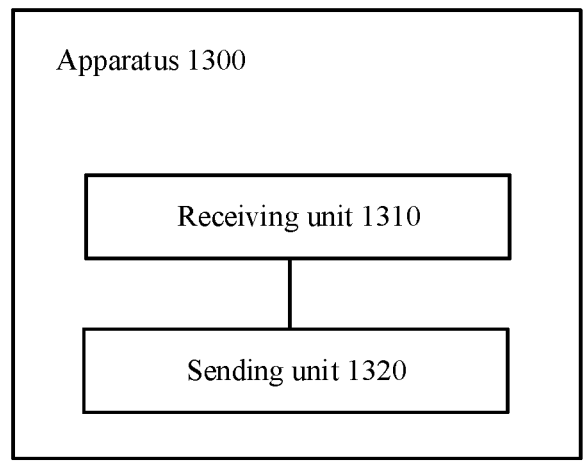
FIG. 13 is a schematic structural diagram of an apparatus according to another embodiment of this application.

FIG. 13 is a schematic structural diagram of an apparatus 1300 according to an embodiment of this application. The apparatus includes units that can implement steps performed by the network management device in the foregoing embodiments. For example, the units can perform the method performed by the network management device in FIG. 7, FIG. 8, or FIG. 10. The apparatus 1300 includes:
- a receiving unit 1310, configured to receive second information from a distributed unit, where the second information includes at least one of the following: allowed physical cell identifier PCI information, unallowed PCI information, or PCI conflict information; and
- a sending unit 1320, configured to send PCI allocation information to the distributed unit, where the PCI allocation information is used to indicate a PCI allocated to a serving cell of the distributed unit.

Alternatively,
the receiving unit 1310 is configured to receive a first update request message from the distributed unit, where the first update request message is used to request to update configured PCI information; and
the sending unit 1320 is configured to send updated configured PCI information to the distributed unit.

Figure 14:
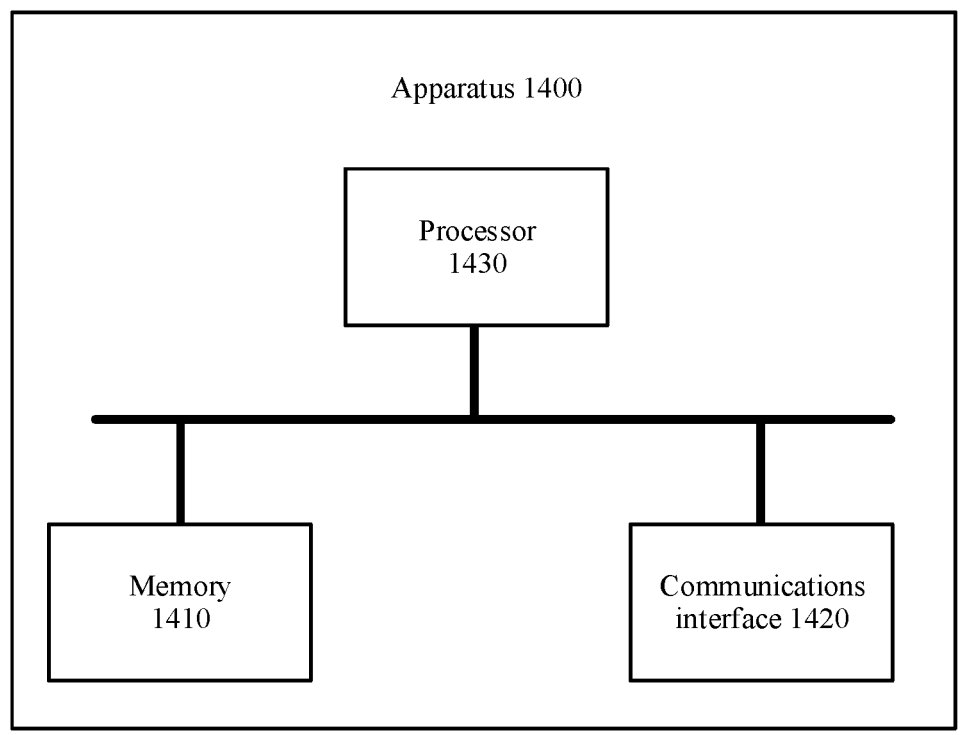
FIG. 14 is a schematic structural diagram of an apparatus according to another embodiment of this application.

FIG. 14 is a schematic structural diagram of an apparatus 1400 according to an embodiment of this application. The apparatus includes units that can implement steps performed by the distributed network element in the foregoing embodiments. For example, the units can perform the methods performed by the distributed unit in FIG. 6 to FIG. 10. The apparatus 1400 includes:
- a memory 1410, configured to store a program;
- a communications interface 1420, configured to communicate with another device; and
- a processor 1430, configured to: execute the program in the memory 1410, where when the program is executed, the processor 1430 is configured to: receive, through the communications interface 1420, first information sent by a central unit, and the first information includes at least one of the following: allowed physical cell identifier PCI information, unallowed PCI information, or PCI conflict information; and determine a PCI of a serving cell of the distributed unit based on the first information.

Alternatively,
when the program is executed, the processor 1430 is configured to: receive PCI allocation information through the communications interface 1420, where the PCI allocation information is used to indicate the PCI allocated to the serving cell of the distributed unit; and allocate the PCI to the serving cell of the distributed unit based on the PCI allocation information.

Figure 15:
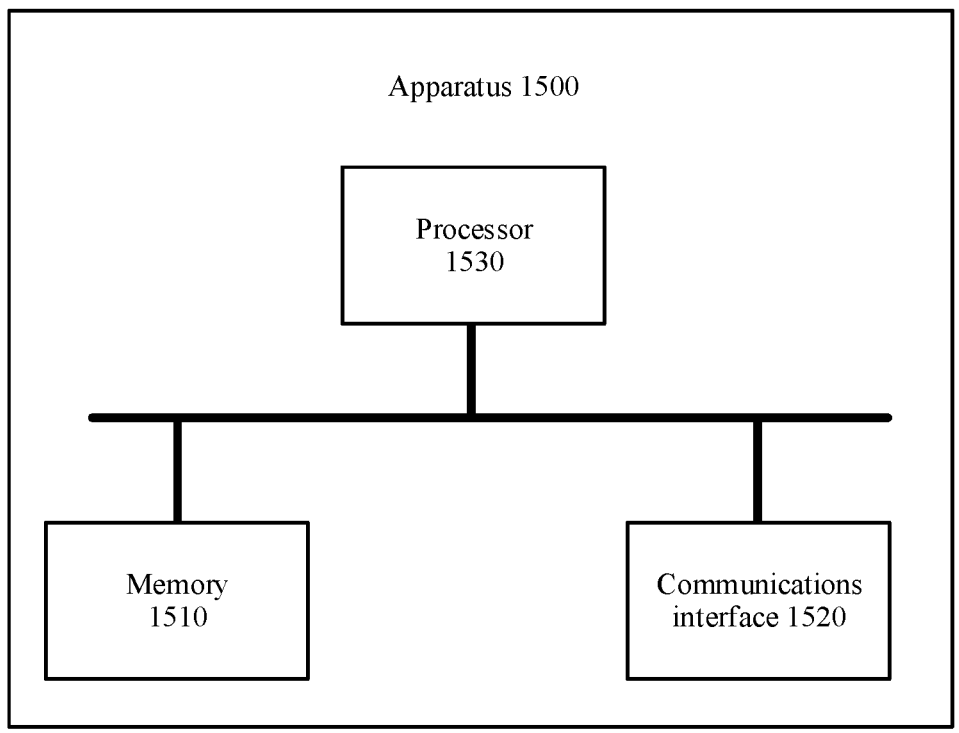
FIG. 15 is a schematic structural diagram of an apparatus according to another embodiment of this application.

FIG. 15 is a schematic structural diagram of an apparatus 1500 according to an embodiment of this application. The apparatus includes units that can implement steps performed by the central network element in the foregoing embodiments. For example, the units can perform the methods performed by the central unit in FIG. 6 to FIG. 10. The apparatus 1500 includes:
- a memory 1510, configured to store a program;
- a communications interface 1520, configured to communicate with another device; and
- a processor 1530, configured to: execute the program in the memory 1510, where when the program is executed, the processor 1530 is configured to: determine first information, and the first information includes at least one of the following: allowed physical cell identifier PCI information, unallowed PCI information, or PCI conflict information; and send the first information to a distributed unit through the communications interface 1520.

Alternatively,
when the program is executed, the processor 1530 is configured to determine a PCI of a serving cell of the distributed unit; and send PCI allocation information to the distributed unit through the communications interface 1520, where the PCI allocation information is used to indicate the PCI allocated to the serving cell of the distributed unit.

Figure 16:
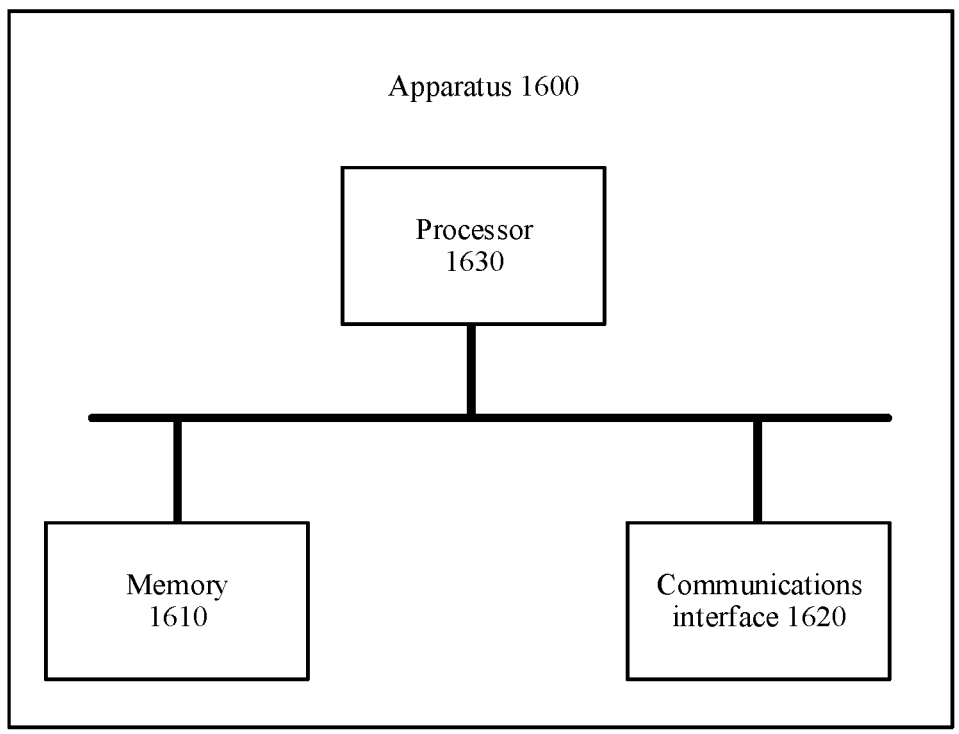
FIG. 16 is a schematic structural diagram of an apparatus according to another embodiment of this application.

FIG. 16 is a schematic structural diagram of an apparatus 1600 according to an embodiment of this application. The apparatus includes units that can implement steps performed by the network management device in the foregoing embodiments. For example, the units can perform the method performed by the network management device in FIG. 7, FIG. 8, or FIG. 10. The apparatus 1600 includes:
- a memory 1610, configured to store a program;
- a communications interface 1620, configured to communicate with another device; and
- a processor 1630, configured to execute the program in the memory 1610, where when the program is executed, the processor 1630 is configured to: receive second information from a distributed unit through the communications interface 1620, and the second information includes at least one of the following: allowed physical cell identifier PCI information, unallowed PCI information, or PCI conflict information; and send PCI allocation information to the distributed unit through the communications interface 1620, where the PCI allocation information is used to indicate a PCI allocated to a serving cell of the distributed unit.

Alternatively,
when the program is executed, the processor 1630 is configured to: receive a first update request message from the distributed unit through the communications interface 1620, where the first update request message is used to request to update configured PCI information; and send updated configured PCI information to the distributed unit through the communications interface 1620.

Optionally, the communications interface (1420, 1520, or 1620) may be a receiver or a transmitter, or may be a transceiver.

A person of ordinary skill in the art may be aware that units, algorithms, and steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a network management device, physical cell identifier (PCI) conflict report message from a central unit of a base station, wherein the PCI conflict report message includes at least one of the following: an identifier of a PCI with a PCI conflict, an identifier of a cell with a PCI conflict, a type of a PCI conflict, frequency information of a cell with a PCI conflict, or an identifier of a neighbor access network device with a PCI conflict;
   determining, by the network management device, a PCI reallocated to a serving cell of a distributed unit of the base station based on the PCI conflict report message; and
   sending, by the network management device, PCI allocation information to the distributed unit, wherein the PCI allocation information indicates the PCI reallocated to the serving cell of the distributed unit.

2. The method according to claim 1, wherein the network management device includes an operation, administration, and maintenance (OAM) device.

3. The method according to claim 1, wherein the PCI conflict report message comprises the identifier of the PCI with the PCI conflict.

4. The method according to claim 1, wherein the PCI conflict report message comprises the identifier of the cell with the PCI conflict.

5. The method according to claim 1, wherein the PCI conflict report message comprises the type of the PCI conflict.

6. The method according to claim 1, wherein the PCI conflict report message comprises the frequency information of the cell with the PCI conflict.

7. The method according to claim 1, wherein the PCI conflict report message comprises the identifier of the neighbor access network device with the PCI conflict.

8. An apparatus, comprising:
   at least one processor; and
   one or more memories coupled to the at least one processor and storing programming instructions for execution by the at least one processor to cause the apparatus to perform operations comprising:
   receiving physical cell identifier (PCI) conflict report message from a central unit of a base station, wherein the PCI conflict report message includes at least one of the following: an identifier of a PCI with a PCI conflict, an identifier of a cell with a PCI conflict, a type of a PCI conflict, frequency information of a cell with a PCI conflict, or an identifier of a neighbor access network device with a PCI conflict;
   determining a PCI reallocated to a serving cell of a distributed unit of the base station based on the PCI conflict report message; and
   sending PCI allocation information to the distributed unit, wherein the PCI allocation information indicates the PCI reallocated to the serving cell of the distributed unit.

9. The apparatus according to claim 8, wherein the apparatus comprises an operation, administration, and maintenance (OAM) device.

10. The apparatus according to claim 8, wherein the apparatus comprises a chip.

11. The apparatus according to claim 8, wherein the PCI conflict report message comprises the identifier of the PCI with the PCI conflict.

12. The apparatus according to claim 8, wherein the PCI conflict report message comprises the identifier of the cell with the PCI conflict.

13. The apparatus according to claim 8, wherein the PCI conflict report message comprises the type of the PCI conflict.

14. The apparatus according to claim 8, wherein the PCI conflict report message comprises the frequency information of the cell with the PCI conflict.

15. The apparatus according to claim 8, wherein the PCI conflict report message comprises the identifier of the neighbor access network device with the PCI conflict.

16. One or more non-transitory computer-readable media storing computer instructions, that when executed by one or more processors, cause a computing device to perform operations comprising:
receiving physical cell identifier (PCI) conflict report message from a central unit of a base station, wherein the PCI conflict report message includes at least one of the following: an identifier of a PCI with a PCI conflict, an identifier of a cell with a PCI conflict, a type of a PCI conflict, frequency information of a cell with a PCI conflict, or an identifier of a neighbor access network device with a PCI conflict;
determining a PCI reallocated to a serving cell of a distributed unit of the base station based on the PCI conflict report message; and
sending PCI allocation information to the distributed unit, wherein the PCI allocation information indicates the PCI reallocated to the serving cell of the distributed unit.

17. The one or more non-transitory computer-readable media according to claim 16, wherein the computing device comprises an operation, administration, and maintenance (OAM) device.

18. The one or more non-transitory computer-readable media according to claim 16, wherein the PCI conflict report message comprises the identifier of the PCI with the PCI conflict.

19. The one or more non-transitory computer-readable media according to claim 16, wherein the PCI conflict report message comprises the identifier of the cell with the PCI conflict.

20. The one or more non-transitory computer-readable media according to claim 16, wherein the PCI conflict report message comprises the type of the PCI conflict.

* * * * *